United States Patent [19]
Qiu et al.

[11] Patent Number: 5,505,395
[45] Date of Patent: Apr. 9, 1996

[54] MULTI-GRADE PAPERBOARD WINDING CORES FOR YARNS AND FILMS HAVING ENHANCED RESISTANCE TO INSIDE DIAMETER REDUCTION

[75] Inventors: Yanping Qiu; Terry D. Gerhardt, both of Madison, Wis.

[73] Assignee: Sonoco Products Company, Hartsville, S.C.

[21] Appl. No.: 187,051

[22] Filed: Jan. 21, 1994

Related U.S. Application Data

[63] Continuation-in-part of Ser. No. 71,485, Jun. 4, 1993, Pat. No. 5,393,582.

[51] Int. Cl.$^6$ .............................. B65H 75/10; F16L 9/16
[52] U.S. Cl. .................... 242/118.32; 138/140; 138/144; 156/195; 242/118.31; 242/118.7; 242/118.8; 242/610.1; 428/34.2; 428/36.91
[58] Field of Search ................................ 156/190, 195; 242/118.31, 118.32, 118.7, 118.8, 610, 610.1, 610.4; 138/140, 144; 428/34.2, 36.9, 36.91

[56] References Cited

U.S. PATENT DOCUMENTS

| | | | |
|---|---|---|---|
| 2,363,967 | 11/1944 | Jasper | 138/140 |
| 2,751,936 | 6/1956 | Dunlap et al. | 242/118.32 |
| 2,755,821 | 7/1956 | Stahl | 242/118.32 |
| 3,194,275 | 7/1965 | Biggs, Jr. et al. | 138/144 |
| 3,323,751 | 6/1967 | Cunningham et al. | 242/118.32 |
| 3,362,655 | 1/1968 | Roediger | 242/118.32 |
| 3,400,029 | 9/1968 | Mesrobian | 156/190 |
| 3,429,552 | 2/1969 | Cunningham et al. | 242/118.32 |
| 3,548,883 | 12/1970 | Cohen | 138/144 |
| 3,553,046 | 2/1971 | Rawford et al. | 242/118.32 X |
| 3,581,744 | 6/1971 | Voss et al. | 128/263 |
| 3,587,656 | 6/1971 | Cunningham | 138/144 |
| 3,813,026 | 5/1974 | Biancamaria | 229/4.5 |
| 3,826,445 | 7/1974 | Le Hardy | 242/118.32 |
| 4,792,326 | 12/1988 | Tews | 604/11 |
| 5,167,994 | 12/1992 | Paulson | 428/34.2 |
| 5,393,582 | 2/1995 | Wnag et al. | 242/118.32 X |

FOREIGN PATENT DOCUMENTS

| | | | |
|---|---|---|---|
| 795991 | 6/1958 | United Kingdom | 156/190 |

OTHER PUBLICATIONS

T. D. Gerhardt, *External Pressure Loading of Spiral Paper Tubes: Theory and Experiment*; Journal of Engineering Materials and Technology; vol. 112, pp. 144–150 (1990).

*Primary Examiner*—William Stryjewski
*Attorney, Agent, or Firm*—Bell, Seltzer, Park & Gibson

[57] ABSTRACT

A multi-grade spirally wound paperboard winding core of enhanced resistance to inside diameter deformation includes a plurality of structural paperboard layers having at least two predetermined densities including a lower density and a higher density wherein the lower density is at least about 3% less than the higher density. The cylindrical bodywall is defined in radial cross section by at least one centrally located paperboard layer disposed between at least one radially inwardly located structural paperboard layer and at least one radially outwardly located structural paperboard layer. The centrally located paperboard layer is formed from the lower density paperboard and the inwardly and outwardly located structural paperboard layer are formed from higher density paperboard.

40 Claims, 3 Drawing Sheets

MULTI-GRADE PAPERBOARD WINDING CORES FOR YARNS AND FILMS HAVING ENHANCED RESISTANCE TO INSIDE DIAMETER REDUCTION

CROSS REFERENCE TO RELATED APPLICATIONS

This application is a continuation-in-part of application Ser. No. 71,485 filed Jun. 4, 1993, now U.S. Pat. No. 5,393,582.

FIELD OF THE INVENTION

The invention is directed to multi-grade paperboard winding cores having enhanced resistance to inside diameter reduction. The invention is also directed to winding processes employing these cores and to wound packages of yarns and films including these cores.

BACKGROUND OF THE INVENTION

Paperboard tubes are widely used in the paper, film and textile industries to wind material as it is manufactured. The paperboard tubes themselves are manufactured continuously by spirally winding multiple paperboard strips, or plies, around a stationary mandrel. Paperboard tubes are also made in a convolute winding process by forming a multiple layer wrap of a wide paperboard sheet around a stationary mandrel. Although paperboard is relatively weak on a single ply basis, a tube constructed from multiple spirally wound plies or convolute wound layers of paperboard can attain substantial strength.

In recent years, paperboard tube winding cores have been subjected to increasingly higher levels of stress, due to changes in film and fiber properties, improvements in winders, and changes in package sizes. In the textile industry, substantial increases have been seen in the strength of various yarns, such as multi-filament continuous yarns of nylon, polyester, etc., resulting in the application of increased compressive force to the tube exterior. In the film industry, improved materials and processes have also resulted in higher winding tensions and increased stress on film winding cores. At the same time, efficiency considerations and improvements in automation have resulted in increased quantities of yarn and film wound onto individual yarn and film packages, further increasing the compressive forces applied to the paperboard winding cores.

These increasing compressive forces have increased the occurrences of tube "failure" of the type commonly known as inside diameter (ID) "comedown", which involves a decrease in the tube ID during the winding process. In many textile and film winding processes, the winding core is supported on a winding mandrel. In the event of substantial winding core ID comedown during the winding process, the paperboard core forming the interior of the finished yarn or film package, can so tightly grip the exterior surface of a winding mandrel that the final package cannot be removed from the winding mandrel until the wound yarn or film has been removed from the core, typically by cutting, thus destroying the yarn or film.

It is generally understood that the overall strength of paperboard tubes can be increased by increasing tube wall thickness and/or by employing stronger paper strips for the plies of the tube. In this regard, paper is available in a wide variety of strengths. Paper strength is improved by increasing the mechanical refining of paperboard pulps and by compressing the paperboard during manufacture. Further, paperboard strength is influenced by fiber type and quality. As a general rule, stronger paperboard sheets have a higher density than low strength paperboard sheets.

However, increasing the wall strength of paperboard winding cores by increasing the wall thickness of the cores increases use of natural resources, i.e., wood pulp. And forming the tube walls from higher density, higher strength papers can result in greater use of energy resources due to the greater energy resources often used in forming these papers. Moreover, the nature of the high strength, high density papers limits the types and amounts of recycled paper that can be used in the paper manufacturing process.

In response to industry needs for stronger paperboard cores, substantial effort has been focused on tube manufacturing processes and tube designs. Paperboard is an orthotropic material. Thus, paperboard strength properties are different in the machine direction (MD) and in the cross machine direction (CD) (MD refers to the direction of paper production during the manufacturing process, and CD refers to the direction perpendicular to the MD in the plane of the paper). The difference in properties between the MD and CD can be attributed to the tendency for more paper fibers to be aligned along the MD as compared to the CD. The orthotropic properties of paper influence tube strength and complicate any accurate prediction of tube strength.

In addition, the paperboard strips used to prepare spirally wound paperboard tubes are wound at varying angles, and tube properties depend, at least in part, on the winding angle of the spirally wound strips. The winding angle thus further increases the difficulty of accurately predicting paperboard tube properties.

As with other materials, paperboard tubes exhibit different strength values depending on which strength characteristics are measured. These different strength characteristics, such as compressive strength, tensile strength, beam strength, etc., can vary according to tube construction. The standard industry test to evaluate the strength of paper tubes is the flat crush test. This test involves compressing a tube along its sides by placing the tube between two flat plates. One plate is stationary while the other moves at a constant displacement rate transversely to the axis of the tube. The flat crush strength is the maximum load obtained during the test. The flat crush test has been relied on in the past as an indicator of a tube's resistance to inside diameter reduction, i.e., ID comedown, during a winding process.

Radial crush strength of paperboard tubes can also be evaluated by applying increasing fluid pressure loads uniformly around the circumference of the tubes until their failure; see T. D. Gerhardt, *External Pressure Loading of Spiral Paper Tubes: Theory and Experiment,* Journal of Engineering Materials and Technology, Vol. 112, pp. 144–150, (1990). This paper also provides a detailed mechanics analysis of stresses and strains in single-grade spirally wound paperboard tubes loaded in uniform radial compression and concludes, inter alia, that the maximum hoop stress occurs at the outside radius of spirally wound paperboard tubes under these conditions.

Although paperboard tubes are typically manufactured primarily from single paper grades, multi-grade configurations are also used for various reasons. For example, in some cases, a special surface finish is needed on the tube outside diameter (OD) or on the tube ID, and a paper ply having such a finish is therefore used on the OD or ID. Different grades of paper are also used in order to satisfy other special property requirements for the tube ID or OD, for example, as might be required for interaction with a chuck or other structure.

Although multiple grades of paper have previously been used to produce spirally wound paperboard tubes, multiple grades of paperboard have not in the past, to the knowledge of the present inventors, been positioned with the intent and effect of minimizing inside diameter reduction during a winding process involving a large radial compression loading.

SUMMARY OF THE INVENTION

The invention provides multi-grade paperboard winding cores of enhanced resistance to inside diameter reduction during winding processes. The multi-grade paperboard tube constructions of the invention can provide substantially improved efficiencies in film and yarn winding processes by minimizing or eliminating yarn and film loss from ID comedown failures during winding. The multi-grade winding cores of the invention can provide winding cores of enhanced ID comedown resistance without requiring increases in tube wall thickness and/or while minimizing the necessity for using substantial quantities of resource-intensive high density paperboards.

In accordance with the invention, it has been found that tube constructions which optimize flat crush strength, or which optimize radial crush strength, do not normally result in optimization of resistance to ID reduction during winding processes. Although not wishing to be bound by theory, it is believed that tube ID reduction, i.e., comedown, is not accurately predicted based on tube strength; rather, ID reduction is more accurately predicted based on tube stiffness (modulus), at the inside periphery of the tube wall. Tube strength tests, such as flat crush and radial crush, measure the forces causing complete failure of a tube. However, the radial compression forces applied to a paperboard tube during a yarn or film winding process are normally much less than the radial crush strength of the tube at failure. Nevertheless, ID comedown occurs under these conditions.

The winding cores of the invention are based on the recognition that ID comedown "failure" of paperboard tubes results from excessive radial deformation at the interior of the tube structure, and not necessarily from the complete failure, or destruction, of the tubular structure. Because prior art winding core designs for minimizing ID comedown have been based on tube strength at failure, as determined by flat or radial crush strength tests, such prior art winding cores can still exhibit poor inside diameter stiffness, and thus poor resistance to ID comedown, during winding processes.

This invention provides multi-grade paperboard winding cores having structures optimized for resistance to ID comedown wherein stronger, higher density paperboard materials, are positioned to achieve maximum impact on the ID comedown performance of the winding core. The multi-grade paperboard winding cores of the invention comprise a cylindrical bodywall formed of a plurality of structural paperboard plies or layers in which one or more paperboard layers centrally positioned in the bodywall, have a lower density, i.e., strength, as compared to radially inward and radially outward structural paperboard layers forming the tube bodywall. The radially outward and radially inward paperboard layers are formed from higher density paperboard having a density at least about 3% greater than the centrally positioned paperboard layer or layers.

Preferably, the multi-grade paperboard winding cores of the invention include at least five individual layers, of which at least two are centrally located lower density paperboard layers. The centrally located paperboard layer or layers are positioned, according to preferred embodiments of the invention, at the center of the wall of the paperboard tube or offset radially outwardly within the tubular bodywall. The multi-grade paperboard cores of the invention can be formed by a convolute winding or spiral winding process and are preferably spirally wound tubes.

Advantageously, between about 30% and about 70% of the plies are formed of the lower density paperboard. It is also preferred that the difference in density between the low density and the high density layers be at least about 5%, based on the lower density paperboard.

In other preferred embodiments of the invention, the multi-grade winding cores of the invention are sized and configured for use as textile winding cores. In textile winding core embodiments of the invention, the multi-grade paperboard cores typically include an exterior, circumferentially oriented start-up groove adjacent at least one end for initiating start-up of winding of a yarn, filament or thread wound onto the core. The textile winding cores advantageously have an inside diameter of greater than about 2.8 inches (70 mm), and less than about 6 inches (150 mm). Preferred high speed textile winding core embodiments of the invention are formed of spirally wound paperboard plies wound at a spiral winding angle of greater than 71 degrees. In high speed winding cores having a relatively large ID above about 4.8 in. (120 mm), the paperboard plies are preferably wound at a winding angle of greater than 74 degrees.

The multi-grade paperboard winding cores of the invention can be constructed from paperboards of only two different densities, or from paperboards of three or more densities. In one preferred construction employing paperboards of three densities, the intermediate density paperboard layers are preferably positioned within the tube wall as two separate groups of contiguous layers. One group of intermediate density layers is positioned between the radially inward high density layers, and the centrally located low density paperboard layers. The other group of intermediate density layers is positioned between the centrally located low density layers, and the radially outward high density layers.

The paperboard winding cores of the invention can be prepared from a wide range of paper grades and with varying numbers of layers of each grade. In each instance, construction of the multi-grade, multiple layer paperboard winding cores according to the invention can provide winding cores with improved resistance to inside diameter reduction. Indeed, the tube constructions of the invention can, compared to some prior art paperboard winding cores, both substantially improve winding core performance, and also decrease the overall usage of natural resources, e.g., virgin wood pulp, and energy resources, that are used in manufacture of the winding core. The paperboard winding cores of the invention also increase the flexibility of the tube manufacturing process by providing a choice among different paper types for achieving the desired ID comedown resistance in the final winding core.

The paperboard winding cores of the invention can substantially improve efficiencies in textile and film winding processes, particularly winding processes that apply radial pressures above about 100 psi to the core. Finished packages of wound yarns and films including the winding cores of the invention can thus be produced by textile and/or film manufacturers at a decreased overall cost.

BRIEF DESCRIPTION OF THE DRAWINGS

In the drawings which form a portion of the original disclosure of the invention.

DETAILED DESCRIPTION OF THE INVENTION

In the following detailed description of the invention, the preferred embodiments of the invention are described in order to enable practice thereof. Although a textile winding core is specifically described below, it will be apparent that the invention is also applicable to film winding cores. It will also be apparent that various terms are used in order to describe the invention and not for purposes of limitation, and that the invention is susceptible to numerous changes and variations as will become apparent from a consideration of the invention as shown in the attached drawings and described below.

Figure 1:
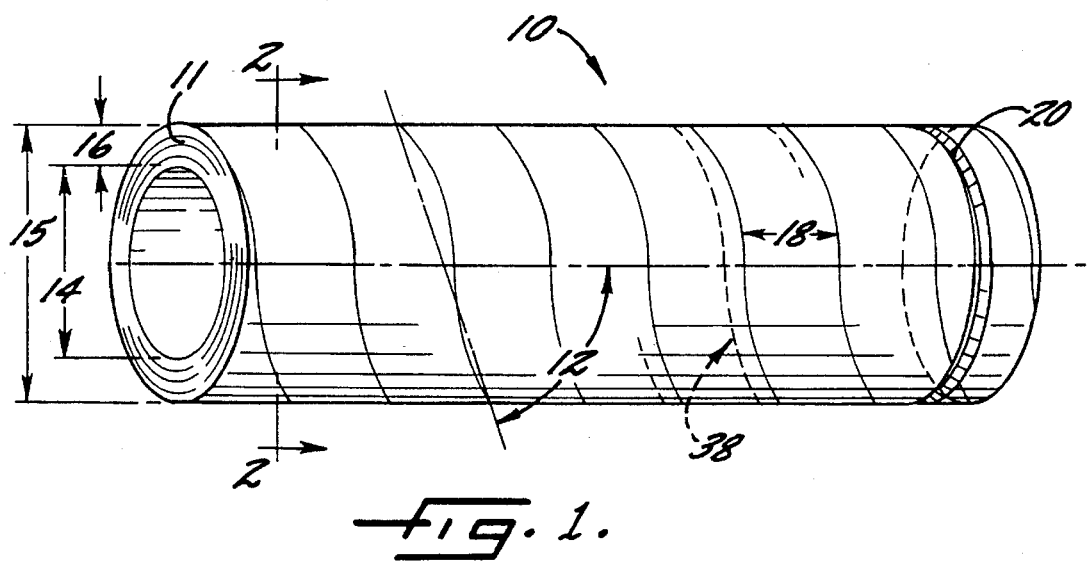
FIG. 1 is a perspective view of a multi-grade spirally wound paperboard winding core in accordance with the invention, configured for use as a yarn winding core.

FIG. 1 illustrates a spirally wound paperboard textile winding core 10 formed of a cylindrical body wall 11 in accordance with the invention. The cylindrical body wall 11 is formed of a plurality of plies of paperboard having a spiral winding angle 12, which is expressed as the angle of wind of the paperboard plies relative to the longitudinal axis of the tubular core 10, as illustrated in FIG. 1.

As also shown in FIG. 1, the winding core 10 has a predetermined inside diameter 14 and a predetermined outside diameter 15 which, together, define a predetermined wall thickness 16. The paperboard plies forming tube 10 have a width 18 which is normally about the same for all layers of the bodywall 11, but which can vary slightly in the case of a relatively thick bodywall. The width of the ply forming the inside surface of the tube, taken together with the inside diameter 14 of the tube, determines the spiral winding angle 12 of the tube due to geometrical considerations.

As illustrated in FIG. 1, textile winding cores typically include a start-up groove 20 or a similar means adjacent one end (or, in some cases, both ends) of the core, useful in initiating start-up of a yarn, which may be a continuous monofilament, multifilament, or spun yarn, that is wound onto the core at high speed. As is well known to those skilled in the art, the start-up groove 20 provides a mechanism for gripping the start-up end of a thread or yarn which comes into contact with the groove 20 due to the action of an operator or an automatic mechanism in a conventional winder.

Because of standards and uniformity considerations in the textile industry, equipment for winding and unwinding of yarns and threads is generally constructed to support a textile core having an inside diameter 14 of greater than about 2.8 inches (70 mm) up to less than about 6 inches (150 mm). For high speed performance, the textile cores 10 are typically limited to wall thicknesses of less than about 0.40 in. (10.2 mm). The textile winding cores 10 normally have a length within the range of between about 100 mm (3.9 in) and 350 mm (13.8 in). Winding cores for winding of film and paper according to the invention can have lengths up to about 150 inches and diameters up to 12 inches; however, winding cores of the invention are particularly desirable for use with winders in which a mandrel extends substantially into, or fully through the winding core, in which case the core will typically have a length of less than about 36 in, more typically less than about 24 in.

Figure 2:
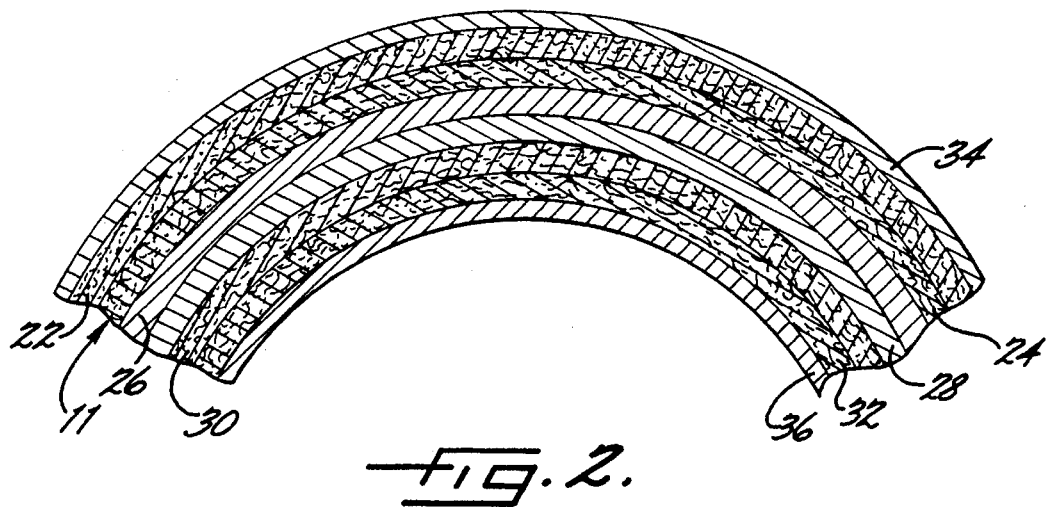
FIG. 2 is a greatly enlarged partial cross-sectional view taken along line 2—2 of FIG. 1 illustrating the arrangement of paperboard layers in the multi-grade spirally wound paperboard core of FIG. 1.

FIG. 2 illustrates one preferred bodywall construction for bodywall 11 of the spirally wound tube illustrated in FIG. 1. In the bodywall construction illustrated in FIG. 2, there are 6 structural paperboard layers, 22, 24, 26, 28, 30 and 32. In addition, the bodywall illustrated in FIG. 2 includes non-structural exterior and interior layers, 34 and 36, respectively, that provide various surface characteristics to the winding cores, discussed below.

The structural layers illustrated in FIG. 2, i.e., layers 22, 24, 26, 28, 30 and 32, are positioned to optimize ID comedown resistance. Paperboard layers 26 and 28 are positioned in a central portion of the tube wall 11. These centrally positioned paperboard layers are formed from lower density paperboard ply strips. The central lower density paperboard layers 26 and 28 are positioned between two radially outwardly positioned structural layers, 24 and 22, and two radially inwardly positioned paperboard layers, 30 and 32. The radially inwardly located layers, 30 and 32, and also the radially outwardly located layers, 24 and 22, are formed from paperboard having a density higher than that of the low density paperboard used to form layers 26 and 28. The higher density plies 30, 32 and 24, 22 can have the same or different densities, but are each higher than the density of the central plies.

Although the textile winding core of FIG. 1 is shown as having 6 structural layers, it will be apparent that winding cores of the invention can have a wide ranging number of layers from, for example, five layers up to about 15–25 layers and higher. In preferred embodiments of the invention, the winding cores will include at least 8 structural layers. In addition, it is preferred that the cores include at least two, more preferably at least four, lower density layers, and at least two radially exterior and at least two radially interior paperboard layers of a higher density paperboard.

Paperboard densities are determined for the purposes of the subject invention in accordance with the Tappi 220 and 411 standard tests. According to these tests, the paperboard is fully conditioned at 73°±1° F. and at 50%±2% relative humidity until it reaches equilibrium. Thereafter, at least 5 samples from the paperboard are measured for thickness, and area and are weighed. Density is then determined by dividing the weight in grams by the volume in cubic centimeters.

Paperboard strips or plies of a widely varying range of densities and thicknesses are used to form paperboard tubes as is well known in the art. The present invention can employ paperboard plies having thicknesses and densities throughout the ranges of thickness and density conventionally used in the art. Typically such densities range from about 0.50 to about 0.90 $g/cm^3$, more typically from about 0.55 to about 0.85 $g/cm^3$. Paperboard strength and density are typically varied by varying pulp treatments, degree of nip compression and raw materials, and can also be changed by employing various known additives and strengthening agents during the paper making process. Paperboard plies conventionally used in forming winding cores and useful herein typically have a thickness within the range of between about 0.003 in. and about 0.050 in., more typically between about 0.008 in. and about 0.040 in.

Preferably, in the winding cores of the invention, at least a portion of the paperboard plies forming each of the radially interior and radially exterior layers, 30, 32, and 22, 24, respectively, of the body wall 11, have a density greater than about 0.70 g/cm$^3$ because of the strength requirements for winding cores. More preferably, the textile winding cores of the invention include at least two radially interior layers and at least two radially exterior layers, each having a density greater than about 0.70 g/cm$^3$. In extremely high stress environments, it is desirable that at least one radially exterior, and at least one radially interior layer have a density greater than about 0.73 g/cm$^3$.

The paperboard layers of higher and lower density have a density difference of at least about 3%. This difference is determined by subtracting the density of the plies forming the lower density paperboard layer or layers from the density of the paperboard forming higher density paperboard layer and expressing the difference as a percentage of the density of the lower density paperboard layer. Advantageously, the higher density paperboard layers have a density at least about 5% greater than the low density layers.

Advantageously, between about 15% and about 85% of the total structural layers are formed from higher density paperboard. The exact ratio of high density and low density layers can be varied depending on tube wall thickness and strength requirements. For high strength tubes, it is preferred that between about 30 and about 70% of the layers are higher density paperboard.

Returning to FIGS. 1 and 2, typically in a textile core, a very thin non-structural surface layer such as layer 34 is provided in order to impart certain surface finish, texture and/or color characteristics to the surface of the textile core. Normally, a paper material such as a parchment paper is used to form surface layer 34. It is also conventional to employ a surface layer 34 wherein the edges of the ply are overlapped a small amount as indicated generally by phantom lines at 38 in FIG. 1. A thin paperboard non-structural interior layer 36 is also shown in FIG. 2.

As will be apparent to those skilled in the art, such non-structural layers can be formed of paperboard or non-paperboard materials including foils, films, impregnated paper layers, and the like. Such non-structural layers can be included in winding cores to provide special surface properties including a special surface finish, a gripping surface, a coloring layer or the like. For the purposes of the present invention, such exterior layers and interior layers which are provided for specific surface property functions, and which do not contribute substantially to wall strength or thickness, are considered to be non-structural layers. However, those skilled in the art will recognize that a structural layer can include a surface treatment in order to provide a desired finish, color, or the like to the exterior or interior of the tube surface. In such instances, wherein the paperboard layer is constructed and arranged for contributing both to (1) surface characteristics such as finish, color, hardness or the like; and (2) wall strength and/or thickness; such a layer is considered to be a structural layer. For example, textile winding cores typically include, just below the parchment layer, a paperboard layer having a surface of greater smoothness than the surface of common paperboard. This paperboard layer typically has a thickness and strength such that it contributes substantially to the wall thickness and strength of the winding core, and is thus considered to be a structural layer.

Again returning to FIG. 1, the plies forming the winding core 10 normally are wound at a winding angle of greater than about 55 degrees. In preferred high speed winding core embodiments of the invention, the spirally wound paperboard plies forming the structural layers of the core 10, each form a spiral winding angle with the axis of the cylindrical body wall of greater than 71 degrees. In winding cores having a relatively large ID of between about 4.8 in. (120 mm) and 6 in. (150 mm), the paperboard plies forming the spirally wound paperboard winding cores preferably form a winding angle of greater than 74 degrees. These high wind angle winding cores exhibit enhanced high speed winding capability for winding of textile filaments and yarns and other materials such as films, by minimizing or eliminating the phenomena of core disintegration or 'explosion' during high speed winder start-up, as disclosed in U.S. patent application Ser. No. 08/087,599; filed Jul. 2, 1993; by Yanping Qiu, Terry D. Gerhardt, Tony F. Rummage, and Clifford A. Bellum, Jr. for "HIGH SPIRAL ANGLE TEXTILE CORES", which is incorporated herein by reference. In accord with the present invention, it has been found that high winding angles also improve the ID comedown resistance of winding cores by increasing the interior diameter stiffness of the cores.

Figure 3:
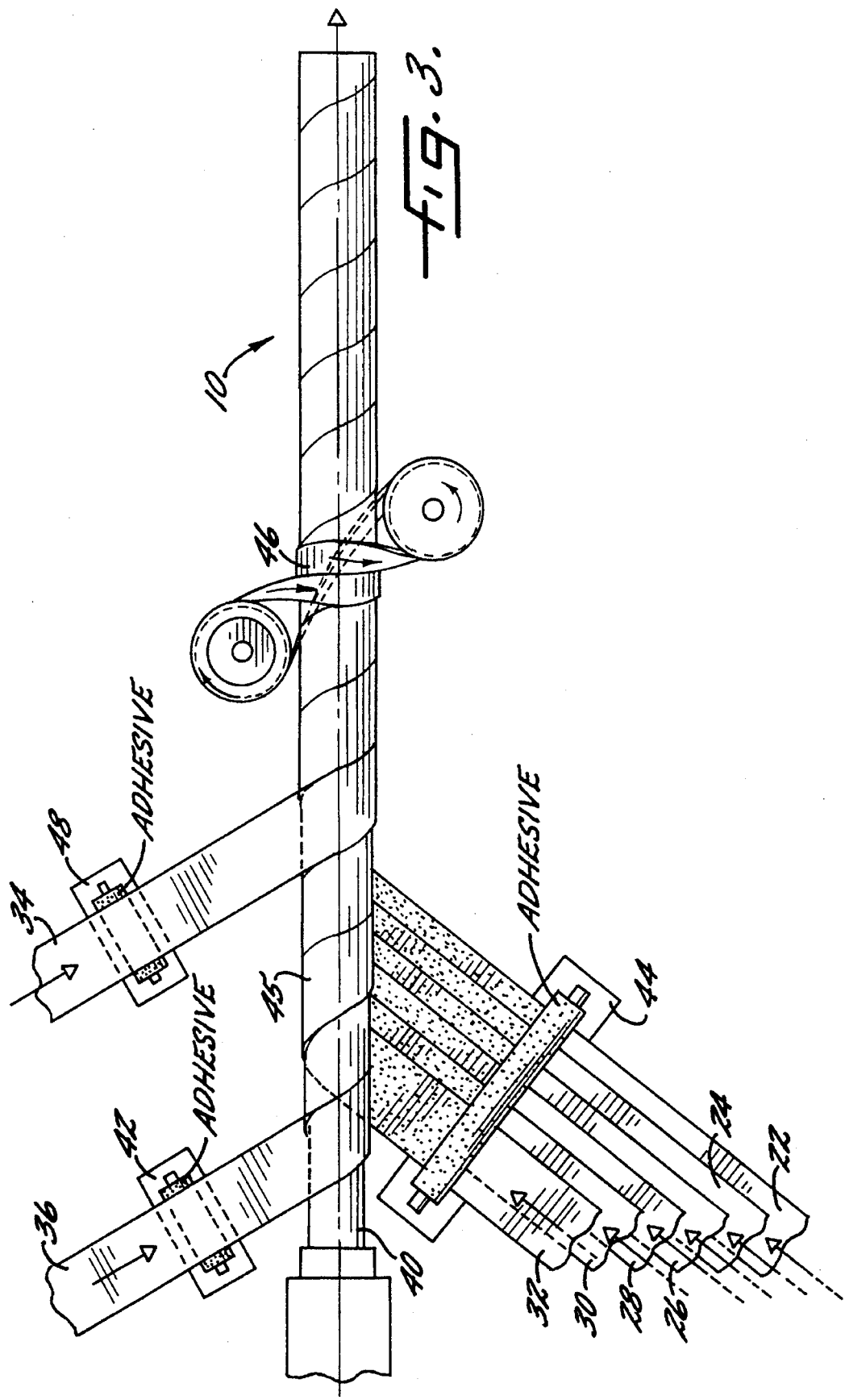
FIG. 3 schematically illustrates the process for manufacturing paperboard tubes according to one preferred embodiment of the invention.

FIG. 3 schematically illustrates one preferred process of forming multi-grade paperboard tubes in accordance with the invention. In FIG. 3, the innermost non-structural paperboard ply 36 is supplied from a source (not shown) for wrapping around a stationary mandrel 40. Prior to contacting the mandrel 40, the paperboard ply 36 is treated on its exterior face with a conventional adhesive from an adhesive supply 42. The next paperboard ply layer 32 is thereafter wound onto layer 36. Layer 32, which is the innermost structural paperboard layer is formed of a higher density paperboard material as described previously. This layer is typically treated on both exterior and interior faces by immersion in an adhesive bath 44, or by a roller coating, or a metering adhesive coating process as is known in the art. Thereafter, paperboard layers 30, 28, 26, 24 and 22, respectively are wound in overlapping relation onto the first two layers in order to build up the structure of the paperboard wall. As with layer 32, each of plies 30, 28, 26, 24 and 22 are immersed in an adhesive bath 44 or are otherwise coated with adhesive prior to winding onto the mandrel 40. As discussed previously with respect to FIG. 2, it will be apparent that plies 28 and 26 are lower density paperboard plies while plies 32, 30, 24 and 22 are higher density paperboard plies. It will also be apparent that the higher density paperboard plies, 28 and 26 will form contiguous paperboard layers positioned centrally within the tube wall between the radially interior low density contiguous paperboard layers formed from plies 32 and 30, and the radially exterior contiguous paperboard layers formed from plies 24 and 22.

A rotating belt 46, driven by means not shown, rotates the entire multiple layered structure 45, thereby causing the structure to move to the right on mandrel 40. Thereafter, a non-structural ply 34 may be applied to the outside of the partially formed tube 45 to thereby form the completed tube structure 10 illustrated in FIG. 1. Although not specifically shown in FIG. 3, as known to those skilled in the art, it is typical that plies provided for exterior surface smoothness, such as non-structural ply 34, are applied to the tube structure at a location downstream of the rotating belt 46. Prior to contacting the partially formed tube structure 45, non-structural paperboard ply 34 is coated on its bottom face by adhesive supply 48 with an adhesive material. The exterior face of nonstructural ply 34 contributes a predetermined surface finish or appearance to the outside of the thus formed continuous tube 10.

The continuous tube 10 is moved to the right down the mandrel 40 and is thereafter cut into parent tubes by a rotating saw or blade, (not shown). Thereafter each parent tube is cut into individual tubes having a predetermined length that is chosen depending on the desired end use for the paperboard tube. For example, where the paperboard tube is intended for use as a textile core, the tube length will normally be within the range of between about 100 mm (3.9 in) and 350 mm (13.8 in). Where the paperboard tube is intended for use as a support for a film or foil material, the length will typically be within the range of between about 4 inches and about 150 inches, preferably less than about 36 in, more preferably less than about 24 in.

The process illustrated in FIG. 3 is subject to many changes well known in the art. For example, the system can include several belts 46; the plies can all be fed from the same side of the mandrel; the plies can be fed on top of or beneath the mandrel as desired., etc.

The tubes and the tube forming process illustrated in FIGS. 1–3 are spiral wound tubes and processes. However, the invention is also applicable to convolute wound tubes. In such case, a single sheet of paperboard can be wound a plurality of turns at 90 degrees on a mandrel to form one or a plurality of contiguous layers or plies of the same density. Thereafter a second paperboard sheet of a lower density is used to form one or a plurality of layers, of a lower density radially outwardly on top of the first layer or groups of layers. Then, a third paperboard sheet of density higher than the second sheet is used to form a layer, or a group of layers radially outwardly on top of the layer or layers formed from the second sheet.

Figure 4:
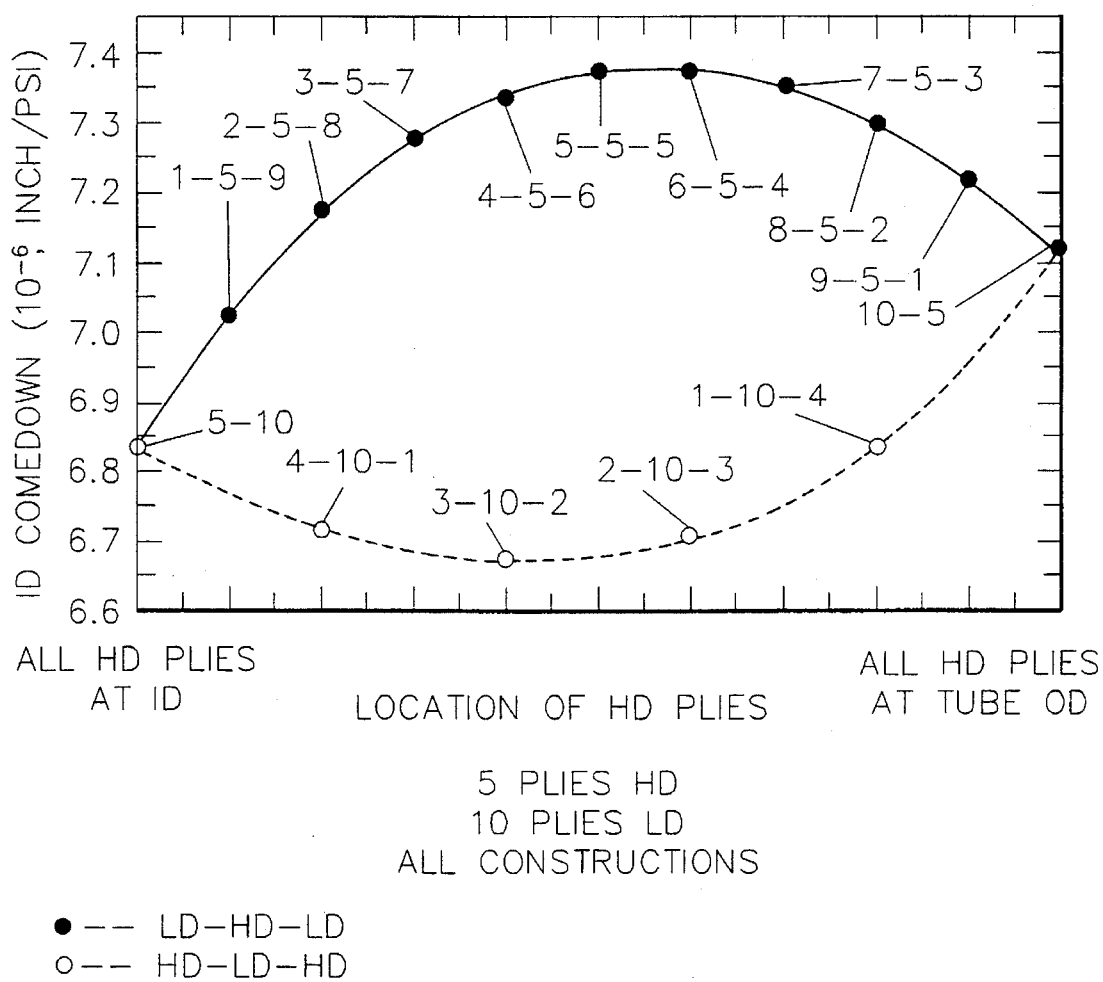
FIG. 4 is a composite graph that illustrates ID comedown, based on computer modeling, for multi-grade paperboard winding cores having 15 layer constructions of five low density paperboard layers and 10 high density paperboard layers, and wherein the high density and low density layers are provided in differing radial locations throughout the core bodywall.

FIG. 4 is a composite graph that illustrates ID comedown, based on computer modeling, for multi-grade paperboard winding cores having 15 layer constructions of five high density paperboard layers and 10 low density paperboard layers, and wherein the high density and low density layers are provided in differing radial locations throughout the core bodywall.

The results illustrated in FIG. 4 are based on tube models with 3 inch inside diameters using, in each case, 15 plies of 4 in. width, 0.020 in. thickness paperboard plies (corresponding to a wind angle of 65° and a wall thickness of 0.300 in).

Two different types of paperboard, labeled, "LD" and "HD" are used in the model. The density of the HD plies is 0.735 g/cm³, and the density of the LD paper plies is about 0.695 g/cm³. Thus, the HD ply has a density about 6% greater than that of the LD ply. The LD paperboard used in the model is the same paperboard discussed in detail in; T. D. Gerhardt, *External Pressure Loading of Spiral Paper Tubes: Theory and Experiment,* Journal of Engineering Materials and Technology, Vol. 112, pp. 144–150, (1990), with the same physical properties, calculated in the same manner as reported therein. The HD paperboard is assumed to have moduli 50% greater than the LD paperboard (in general correspondence with the higher density noted above). The Poisson's ratio is assumed to be the same for both paperboards. Thus the paperboards are assumed to have the properties set forth in Table 1, below.

TABLE I

| Elastic Constants | High Density Plies | Low Density Plies |
| --- | --- | --- |
| $E_{MD}$ | 1.58 M psi | 1.05 M psi |
| $E_{CD}$ | 0.53 M psi | 0.35 M psi |
| $E_{ZD}$ | 8.3 K psi | 5.5 K psi |
| $G_{MD,CD}$ | 0.33 M psi | 0.22 M psi |
| $v_{MD,CD}$ | 0.39 | 0.39 |
| $v_{MD,ZD}$ | 1.52 | 1.52 |
| $v_{CD,ZD}$ | 1.84 | 1.84 |

$E_{MD}$, $E_{CD}$, and $E_{ZD}$ are Young's moduli along MD, CD, and ZD, respectively; and $G_{MD,CD}$, $v_{MD,CD}$, $v_{MD,ZD}$ and $v_{CD,ZD}$ are in-plane shear modulus, in-plane Poisson's ratio, and out-of-plane Poisson's ratios, respectively.

The ID comedown data set forth in FIG. 4 were derived using the elasticity solution set forth in the previously described T. D. Gerhardt publication. The elasticity equations described in detail therein were extended and used as the basis for computer modeling to calculate the ID comedown of the tube at an applied radial load of 1.0 psi. Typically the radial loads applied during a high stress winding process are believed to exceed about 100 psi, and can exceed 200 psi, or even 300 psi in some cases. Thus the ID comedown values of FIG. 4 would need to be multiplied by actual pressures applied to a winding core, e.g., by a value of 100 when the core is subjected to an applied pressure of 100 psi. In addition it is to be noted that the two paper densities used in the computer model correspond generally to commercially available paperboards of moderately low and moderately high strength.

With reference now to FIG. 4, it can be seen that with a 15 ply tube construction in which only one-third of the plies, (5 plies), are high density paperboard, the ID comedown can vary considerably. When all of the high density paperboard plies are positioned centrally within the tube wall, the ID comedown is the greatest as shown in the top portion of the upper solid line of FIG. 4. ID comedown resistance is increased when at least one of the high density paperboard plies is positioned as the innermost structural layer and when at least one high density paperboard ply is positioned as the outermost structural layer as shown by the various constructions on the lower, dotted line of FIG. 4. In addition, it will be apparent that ID comedown resistance is not optimal where all high density paperboard plies are positioned at either the exterior or at the interior surface of the tube wall. The most desirable ID comedown resistance is provided when all LD paperboard plies are positioned contiguously, as a group within the tube wall and offset slightly towards the tube exterior diameter as shown by the ID comedown resistance of the 3HD-10LD-2HD construction paperboard tube.

The improved winding cores of the invention can be used in various end uses. It will be apparent that the invention is particularly important for those end uses where high compression loading, e.g., above about 100 psi, is an important consideration. These end uses include cores for winding textiles having wall thicknesses ranging from about 0.15 in. (3.8 mm) to about 0.90 in. (11.4 mm), more preferably between about 0.23 in. (6 mm) and about 0.30 in. (7.5 mm), and lengths ranging from about 3.9 in. (100 mm) to about 13.8 in. (350 mm); and winding cores constructed for film having wall thicknesses of 0.15 in. (3.8 mm) to 0.700 in. (17.8 mm) and lengths of from about 5 in. (125 mm) up to about 150 in. (3.8 m), but normally less than about 30 in (760 mm); and the like. Moreover, as indicated previously, the cores of the invention are particularly useful in those winding operations wherein a winding mandrel either extends fully through the ID of the winding core, or a substantial distance into the interior of the core such that in the event of significant ID comedown, removal of the core from the mandrel is problematic.

As indicated previously, the invention offers the potential for significant performance improvement while minimizing use of energy and virgin wood pulp resources, particularly when a plurality of paperboard plies in excess of about 8, preferably about 10 or more, are used in the construction of the paperboard winding core. In such instances, the present invention also provides increased manufacturing flexibility for selecting an appropriate mixture of high density and low density papers, to provide a winding performance optimized for the desired end use.

The invention is susceptible to numerous changes and variations. For example, the invention has been described in connection with the use of paperboard plies having two different densities. However, the invention can also be used with paperboard plies of three or more densities. In such instances, the intermediate density paperboard plies are preferably positioned adjacent the central, low density paperboard plies on both sides thereof. Thus, the intermediate density paperboard plies are preferably divided into substantially equal portions. One portion is used to provide contiguous intermediate density layers between the central low density paperboard plies and the radial outward high density plies. The other intermediate density plies are preferably positioned contiguously between the central low density paperboard plies and the radially inwardly located paperboard plies.

It will also be apparent that this invention can provide substantial benefits for enhancing resistance to ID comedown even when the construction yielding an absolute maximum comedown resistance is not used. Thus for example, several lower density paperboard plies can be positioned centrally within the tube wall, positioned closely adjacent to each other radially, but can include one or more high density layers distributed therein, i.e., between a pair or pairs of the low density plies, without loss of the benefits of the invention. Moreover, non-paperboard plies can be included within the tube wall also. Similarly, the use of exterior and interior low density paperboard layers can be employed within the teachings of this invention so long as other high density layers of the tube wall are positioned on or adjacent to both the exterior and interior surfaces of the tube bodywall for increasing the ID comedown resistance of the tube. In such cases, however, it is preferred that at least a majority or more of the low density plies are centrally located.

The invention has been described in considerable detail with reference to its preferred embodiments. However, variations and modifications can be made without departure from the spirit and scope of the invention as described in the foregoing detailed specification and defined in the appended claims.

That which is claimed is:

1. A multi-grade paperboard winding core of enhanced resistance to inside diameter reduction under radial compression loading comprising:

a tubular bodywall formed from a plurality of structural paperboard layers and being defined in radial cross section by at least one centrally located paperboard layer formed of a paperboard of a first density disposed between at least one radially inwardly positioned structural paperboard layer and at least one radially outwardly positioned structural paperboard layer;

wherein the radially outward and radially inward positioned paperboard layers are formed from a paperboard having a density that is at least about 3% greater than said first density of said paperboard forming the centrally positioned paperboard layer to thereby enhance the resistance to inside diameter reduction under radial compression loading of the multi-grade paperboard winding core.

2. The multi-grade paperboard winding core of claim 1 comprising at least 5 structural paperboard layers including at least two contiguous centrally located layers formed from said first density paperboard.

3. The multi-grade paperboard winding core of claim 2 wherein said tubular bodywall is a spirally wound paperboard bodywall.

4. The multi-grade paperboard winding core of claim 2 wherein the centrally located paperboard layer of said first density are offset radially outwardly from the center of the tubular bodywall.

5. The multi-grade paperboard winding core of claim 2 comprising at least two radially inwardly located paperboard layers having a density above about 0.70 $g/cm^3$ and at least two radially outwardly located paperboard layers having a density above about 0.70 $g/cm^3$.

6. The multi-grade paperboard winding core of claim 5 comprising at least 8 structural paperboard layers.

7. The multi-grade paperboard winding core of claim 1 wherein between about 15% and 85% of the layers in the tubular bodywall are formed of the higher density paperboard.

8. The multi-grade paperboard winding core of claim 1 wherein between about 30% and about 70% of the paperboard layers are formed of the first density paperboard.

9. The multi-grade paperboard winding core of claim 8 comprising at least 15 paperboard layers.

10. The multi-grade paperboard winding core of claim 9 wherein said higher density paperboard layers have a density at least about 5% greater than the lower density paperboard plies.

11. The multi-grade paperboard winding core of claim 1 configured for use as a textile winding core and additionally comprising at least one non-structural layer of paperboard disposed on the exterior surface of the tubular bodywall.

12. The multi-grade paperboard winding core of claim 1 wherein said tubular winding core is a convolutely wound tube.

13. The multi-grade paperboard winding core of claim 1 comprising at least 5 structural paperboard layers including a plurality of centrally located layers formed of said first density paperboard, said centrally located plurality of layers being located radially closely adjacent each other and additionally comprising at least one higher density layer between at least two of said first density layers.

14. A multi-grade spirally wound paperboard winding core adapted for enhanced resistance to inside diameter reduction resulting from an outwardly applied radial compression load resulting from a textile or film material wound onto said core comprising:

a cylindrical bodywall having a plurality of structural paperboard layers formed from paperboard of at least two predetermined densities comprising a first lower density and a second higher density, said second higher density being at least 3% greater than the first lower density and in excess of about 0.70 $g/cm^3$, said cylindrical bodywall being defined in radial cross section by a plurality of contiguous, centrally located paperboard layers formed from the lower density paperboard, said centrally located layers being disposed between at least one inwardly located structural paperboard layer and at least one outwardly located structural paperboard layer, each of said inwardly and outwardly located paperboard layers being formed from said higher density paperboard or paperboard of a density higher than said first higher density.

15. The multi-grade spirally wound paperboard winding core of claim 14 comprising at least two contiguous higher density paperboard layers, each of which are formed from paperboard of density greater than or equal to said second higher density.

16. The multi-grade spirally wound paperboard winding core of claim 15 wherein said contiguous higher density paperboard layers are located radially inwardly of said centrally located paperboard layers.

17. The multi-grade spirally wound paperboard winding core of claim 15 wherein there are a plurality of contiguous higher density paperboard layers formed from paperboard of density greater than or equal to said second higher density, each of which are located radially outwardly of said centrally located paperboard layers.

18. The multi-grade spirally wound paperboard winding core of claim 15 wherein between about 15% and about 85% of the layers in the paperboard in the cylindrical bodywall are formed from said higher density paperboard.

19. The multi-grade spirally wound paperboard winding core of claim 18 comprising at least 10 structural paperboard layers.

20. The multi-grade spirally wound paperboard winding core of claim 15 wherein between about 30% and about 70% of the paperboard layers are formed from said paperboard of said first lower density.

21. The multi-grade spirally wound paperboard winding core of claim 20 comprising at least 15 paperboard layers.

22. The multi-grade spirally wound paperboard winding core of claim 21 comprising at least two contiguous radially inwardly located higher density paperboard layers, each having a having a density greater than or equal to said second higher density and wherein said second higher density is at least about 5% greater than the first lower density.

23. The multi-grade spirally wound paperboard tube of claim 15 additionally comprising at least one non-structural layer formed of paperboard or another material disposed on the exterior surface or the interior surface of the tubular bodywall.

24. The multi-grade spirally wound paperboard winding core of claim 14 comprising at least 5 structural paperboard layers including a plurality of centrally located layers formed of said lower density paperboard, said centrally located plurality of layers being located radially closely adjacent each other and additionally comprising at least one higher density layer between at least two of said lower density layers.

25. The process for forming a multi-grade spirally wound paperboard winding core of enhanced resistance to inside diameter reduction comprising:

applying adhesive to a first group of paperboard plies comprising one or more continuous paperboard plies having a first predetermined density and spirally winding the first group of paperboard plies around a stationary mandrel in overlapping relation;

applying adhesive to a plurality of paperboard plies having a second density such that said first predetermined density is at least about 3% higher than the second density, and spirally winding said plurality of second density continuous paperboard plies in overlapping relation on top of said first group of paperboard plies; and applying adhesive to a third group of paperboard plies comprising one or more continuous paperboard plies having substantially the same density as said first predetermined density and spirally winding said third group of paperboard plies in overlapping relation on top of said plurality of second density paperboard plies to thereby form a multi-grade spirally wound paperboard tube comprising a plurality of plies formed from said first group of continuous paperboard plies, said plurality of second density paperboard plies and said third group of paperboard plies.

26. The process of claim 25 wherein the third group of paperboard plies comprises at least two continuous plies of said first predetermined density.

27. The process of claim 26 wherein the plurality of paperboard plies of second density comprises at least three continuous paperboard plies of said second density.

28. The process of claim 27 wherein the plurality of paperboard plies of said first density have a density at least 5% higher than said second predetermined density.

29. A process for winding a textile or film material comprising:

supporting a tubular multi-grade spirally wound paperboard winding core on a mandrel of a winding apparatus such that the mandrel extends a substantial distance into the interior of the core; and winding a continuous film or yarn onto the multi-grade spirally wound paperboard winding core to thereby apply a radial compression load onto the outer surface of said winding core;

wherein said winding core comprises a cylindrical bodywall having a plurality of structural paperboard layers formed from paperboard of at least two predetermined densities comprising a first lower density and a second higher density, said second higher density being at least 3% greater than the first lower density, said cylindrical bodywall being defined in radial cross section by a plurality of contiguous, centrally located paperboard layers formed from the lower density paperboard, said centrally located layers being disposed between at least one inwardly located structural paperboard layer and at least one outwardly located structural paperboard layer, and each of said inwardly and outwardly located paperboard layers being formed from said higher density paperboard or paperboard of a density higher than said first higher density.

30. The process of claim 29 wherein said second higher density is at least about 0.70 g/cm$^3$.

31. The process of claim 30 wherein said radial compression load applied onto the outer surface of said winding core is at least about 100 psi.

32. The process of claim 30 wherein said multi-grade spirally wound paperboard winding core comprises at least two contiguous higher density paperboard layers, each of which are formed from paperboard of density greater than or equal to said second higher density.

33. The process of claim 32 wherein said mandrel extends fully through said winding core.

34. The process of claim 33 wherein said contiguous higher density paperboard layers are located radially inwardly of said centrally located paperboard layers.

35. The process of claim 33 wherein between about 15% and about 85% of the layers in the paperboard in the cylindrical bodywall are formed from said higher density paperboard.

36. The process of claim 35 wherein said multi-grade spirally wound paperboard winding core comprises at least 8 structural paperboard layers.

37. The process of claim 36 wherein said multi-grade spirally wound paperboard winding core comprises at least two contiguous radially inwardly located higher density paperboard layers, each having a having a density greater than or equal to said second higher density and wherein said second higher density is at least about 5% greater than the first lower density.

38. The process of claim 33 wherein said contiguous higher density paperboard layers are located radially outwardly of said centrally located paperboard layers.

39. The process of claim 30 wherein said radial compression load applied onto the outer surface of said winding core is at least about 200 psi.

40. The process of claim 29 wherein said mandrel extends fully through said winding core.

* * * * *